(12) United States Patent
Kato et al.

(10) Patent No.: US 9,346,124 B2
(45) Date of Patent: May 24, 2016

(54) METHOD FOR MARKING ON METALLIC MEMBER

(71) Applicant: NGK INSULATORS, LTD., Nagoya-shi, Aichi (JP)

(72) Inventors: Kenji Kato, Handa (JP); Kenji Isaka, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 433 days.

(21) Appl. No.: 14/037,759

(22) Filed: Sep. 26, 2013

(65) Prior Publication Data

US 2014/0027412 A1 Jan. 30, 2014

Related U.S. Application Data

(63) Continuation of application No. PCT/JP2012/054231, filed on Feb. 22, 2012.

(30) Foreign Application Priority Data

Mar. 30, 2011 (JP) ................................ 2011-075962

(51) Int. Cl.
*B23K 26/00* (2014.01)
*B23K 26/18* (2006.01)
*B21C 51/00* (2006.01)

(52) U.S. Cl.
CPC ........... *B23K 26/0009* (2013.01); *B21C 51/005* (2013.01); *B23K 26/0006* (2013.01);

(Continued)

(58) Field of Classification Search
CPC ........ B23K 26/00; B23K 26/18; B21C 51/00; B21C 51/005
USPC ............... 219/121.6, 121.68, 121.69, 121.85; 347/224
See application file for complete search history.

(56) References Cited

U.S. PATENT DOCUMENTS 5,306,360 A 4/1994 Bharti et al.
7,728,860 B2 * 6/2010 Kawahara ................ B41J 2/315
347/224

(Continued)

FOREIGN PATENT DOCUMENTS

JP 3-13285 A 1/1991
JP 6-254692 A 9/1994

(Continued)

OTHER PUBLICATIONS

International Search Report of corresponding International Application No. PCT/JP2012/054231, dated on May 22, 2012.
An English Translation of International Search Report of corresponding International Application No. PCT/JP2012/054231, dated on May 22, 2012.

*Primary Examiner* — Samuel M Heinrich
(74) *Attorney, Agent, or Firm* — Global IP Counselors, LLP

(57) ABSTRACT

Provided is a method for marking on a pressed metallic component whose visibility and corrosion resistance in a marking target is ensured. The method includes a step of irradiating a base treatment target region including a marking target region with a laser beam on a first irradiation condition, and a step of irradiating the marking target region with the laser beam on a second irradiation condition, in which a charged energy of the laser beam is set to be smaller on the first irradiation condition than the second irradiation condition, thereby providing between the marking pattern and a non-irradiation region, a base region having a residual stress greater than that of the non-irradiation region and a residual stress smaller than that of the marking pattern, so as to ensure a visibility. Furthermore, a corrosion resistance is ensured by using a metallic member which is heat-treated to enhance the hardness.

6 Claims, 10 Drawing Sheets

(52) U.S. Cl.
CPC ......... *B23K26/0066* (2013.01); *B23K 26/0084* (2013.01); *B23K 26/18* (2013.01); *B21C 51/00* (2013.01); *B23K 26/00* (2013.01); *B23K 2203/04* (2013.01); *B23K 2203/08* (2013.01); *B23K 2203/50* (2015.10)

(56) References Cited

U.S. PATENT DOCUMENTS

2003/0071020 A1\* 4/2003 Hong ................. B23K 26/08
219/121.69

2012/0315594 A1\* 12/2012 Ehrenberger ............ A61C 7/14
433/9

FOREIGN PATENT DOCUMENTS

| JP | 08-150486 A | 6/1996 |
| JP | 11-033752 A | 2/1999 |
| JP | 2001-200345 A | 7/2001 |
| JP | 2002-205178 A | 7/2002 |
| JP | 2002-316236 A | 10/2002 |
| JP | 2003-197402 A | 7/2003 |
| JP | 2008-178888 A | 8/2008 |

\* cited by examiner

F I G . 1
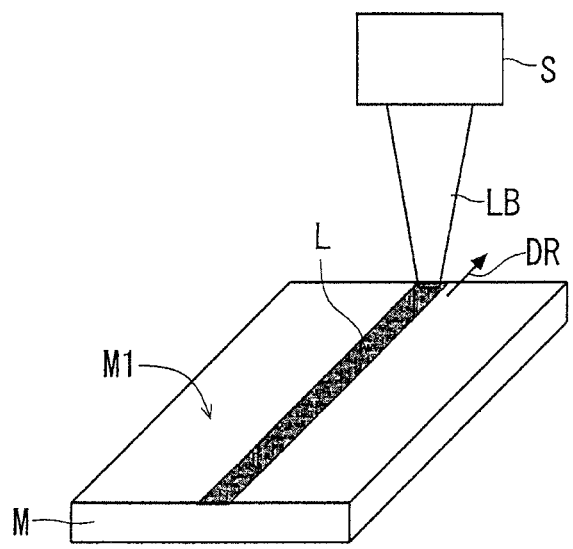
F I G . 2
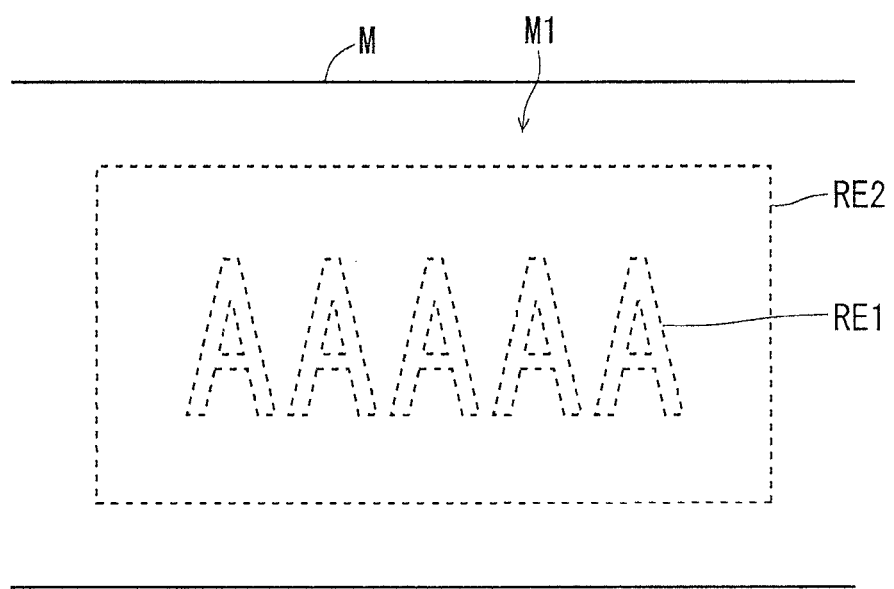

F I G . 3
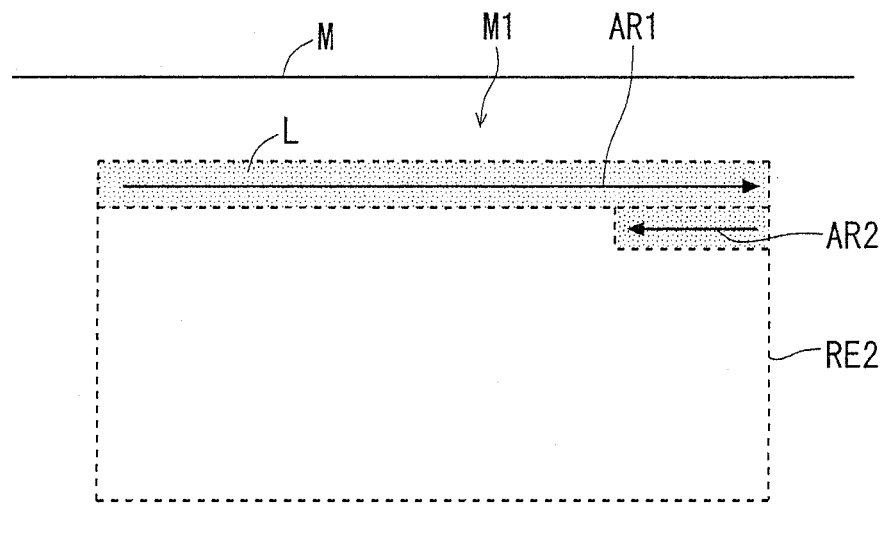
F I G . 4
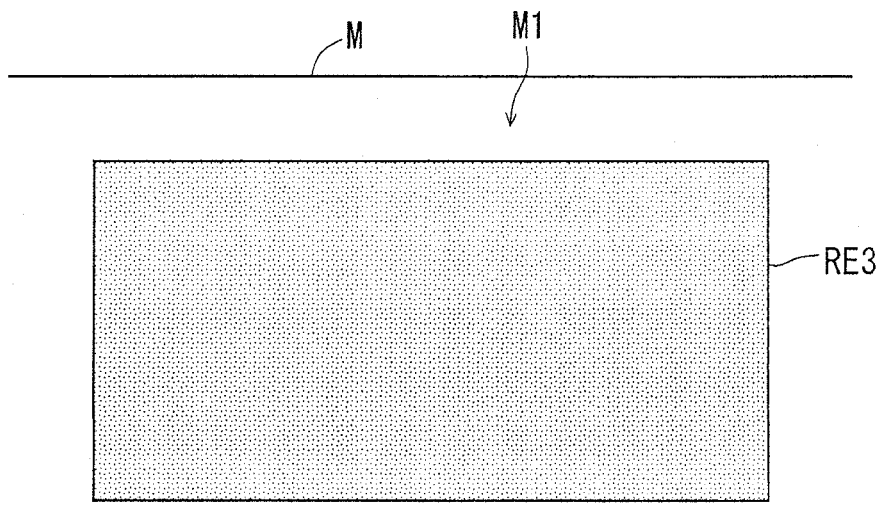

F I G . 5
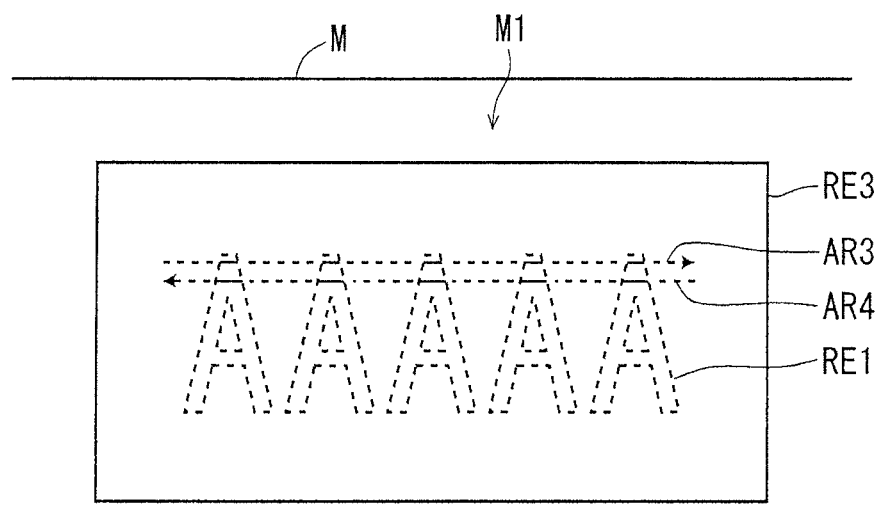
F I G . 6
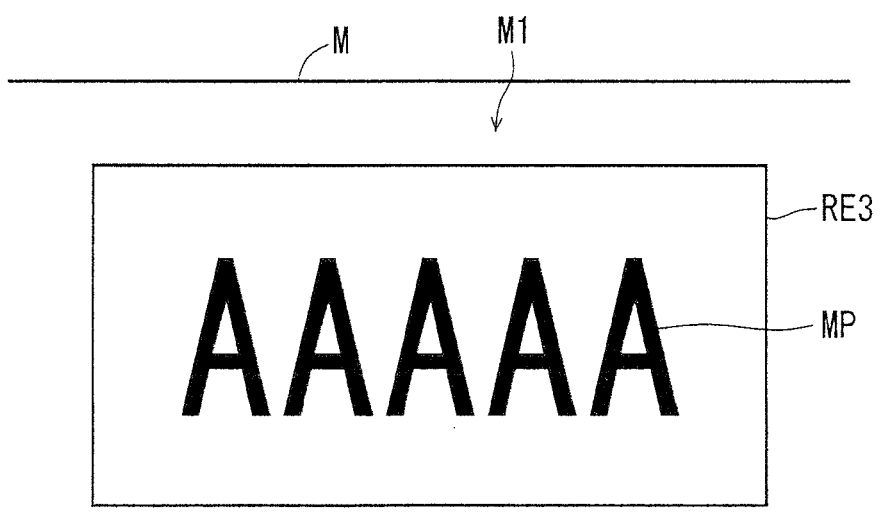

FIG. 7A
NO BASE TREATMENT
FIG. 7B
WITH BASE TREATMENT
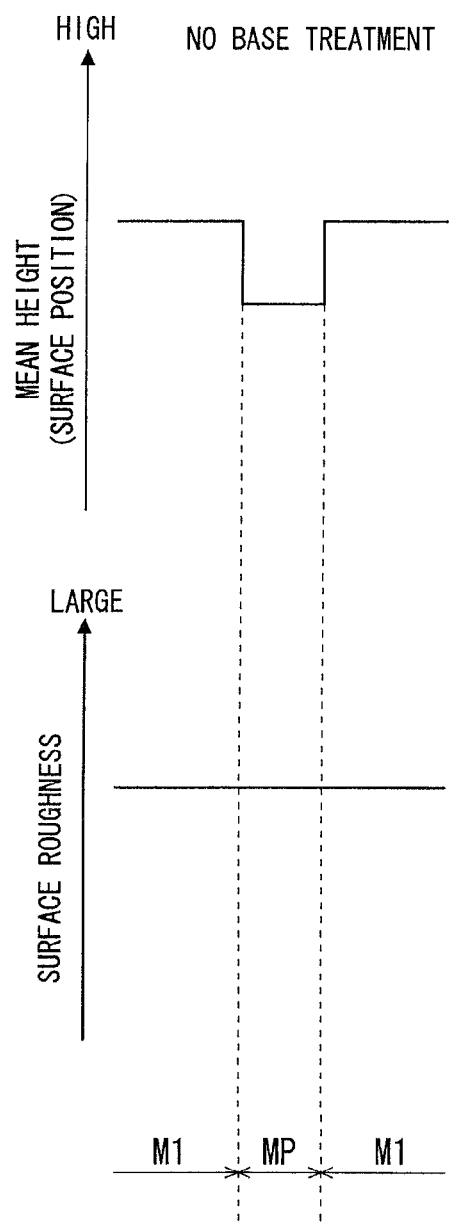
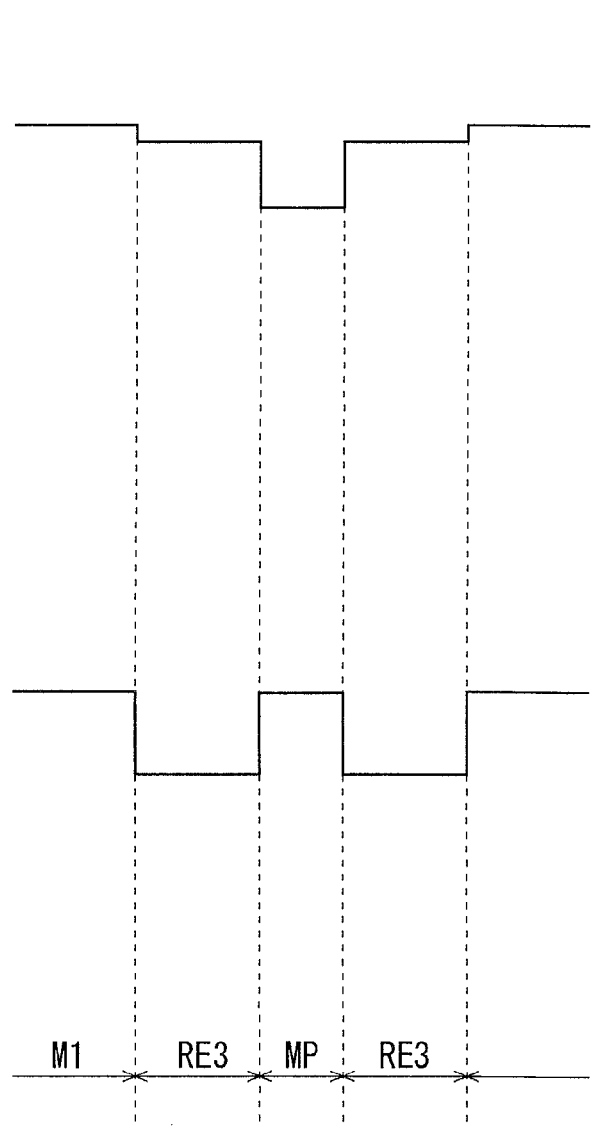

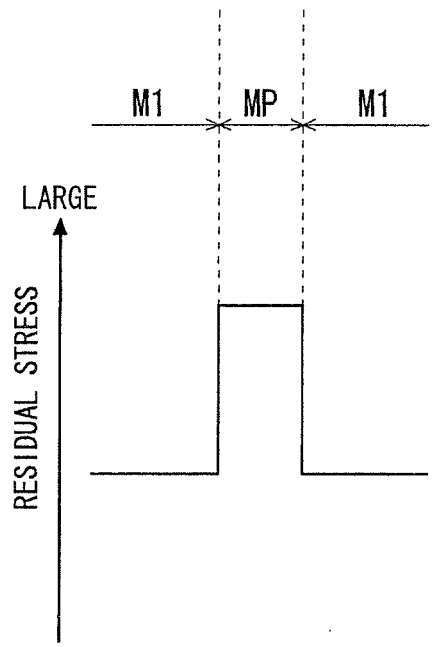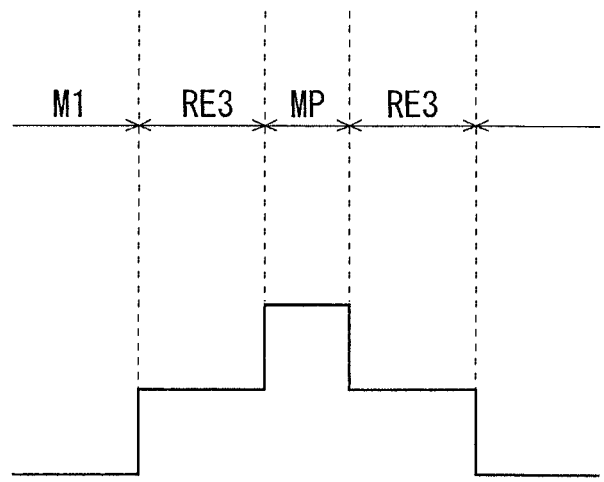
FIG. 8A NO BASE TREATMENT
FIG. 8B WITH BASE TREATMENT

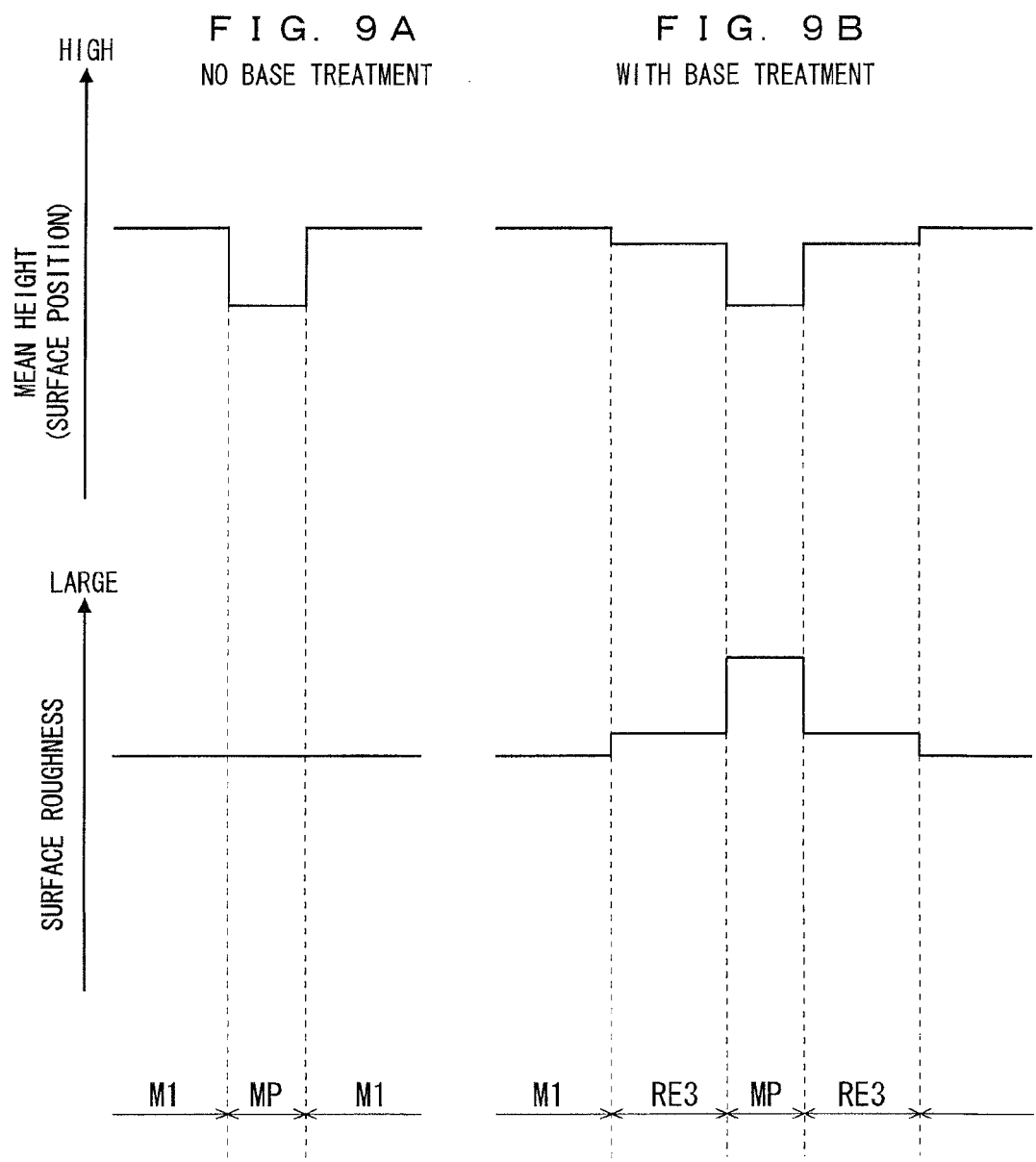

METHOD FOR MARKING ON METALLIC MEMBER

TECHNICAL FIELD

The present invention relates to a technique for marking on a metallic member and more particularly to a technique for marking on a pressed metallic member with a laser beam.

BACKGROUND ART

For metallic parts (for example, an exterior cover for a gas sensor or the like) to be installed in a car (which will be hereinafter referred to as on-vehicle), generally, stainless steel is used (for example, see Patent Document 1 and Patent Document 2). The Patent Document 1 discloses ferrite based stainless steel which is used in some parts for a car including an oxygen sensor or the like and is excellent in cold workability. The Patent Document 2 discloses a method for fabricating metallic fittings to be used in a sensor for a car by forging and molding of ferrite based stainless steel.

Moreover, on various parts which are mass-produced industrially, product-identifying information, for example, a name of a manufacturer, a name of a country, a product model, a lot number, an individual identification number and the like are generally marked (printed) in a manufacturing process thereof. This is to ensure traceability at a subsequent step or after they are put on the market. As a way of the marking, there is a technique for marking with irradiation of a laser beam. There has already been known the technique for irradiating a surface of a glass base for a liquid crystal with a laser beam, thereby forming a concave portion through ablation (for example, see Patent Document 3). Moreover, there is also known the technique for marking by providing a marking layer which is a thin film metal layer on a surface of an electronic device formed of ceramic and then forming a concave portion on the marking layer by a laser beam (for example, see Patent Document 4).

An on-vehicle gas sensor such as an NOx sensor or an oxygen sensor usually has a structure in which an element body portion is covered with an exterior cover (a protective cover) which is a protective member thereof and is used in a state in which a part thereof is protruded into a piping path for an exhaust gas to be discharged from an engine of a car. The exterior cover is fabricated through pressing where stainless steel having been subjected to a heat treatment in order to ensure the hardness is used as its material.

With respect to the exterior cover also, for the purpose described above, a marking of the product-identifying information with a laser beam is performed. It is necessary to carry out the marking in such a manner that the product-identifying information is visually recognized clearly also after the on-vehicle gas sensor is used on the market. In the case that there is applied a comparatively simple marking technique to irradiate a laser beam to form the concave portion as disclosed in the Patent Document 3, however, there is a problem in that the exterior cover after the marking has a low corrosion resistance and stress corrosion cracking is apt to occur. Specifically, the inventors of the present invention has confirmed that, in a stress corrosion cracking test which is carried out by immersing the exterior cover after the marking in a magnesium chloride solution, stress corrosion cracking whose starting point is a marking portion is apt to occur. This is supposed to be caused because, in order to provide a marking pattern having a visibility on a surface of an exterior cover which originally includes concavo-convex to some extent by fabrication through pressing (deep drawing), the irradiation of a laser beam having a high intensity is carried out to form a deeper concave portion than a surface concavo-convex; whereby a residual stress difference (or a residual stress gradient) between a laser beam irradiated region (a marking region) and a periphery is increased. Roughly speaking, the visibility herein referred is assumed to mean that a target portion and a periphery thereof can clearly be distinguished and visual information given by the target portion can easily be recognized in the case that an observer recognizes the target portion by the naked eye.

On the other hand, it is hard to sufficiently obtain the visibility of the marking if the intensity of the laser beam is controlled into a range in which the corrosion resistance is ensured. As a result, even if the technique disclosed in the Patent Document 3 is applied to the metallic parts having a concavo-convex to some extent through execution of processing such as the exterior cover described above, it has been hard to sufficiently obtain the visibility of the product-identifying information while ensuring a corrosion resistance.

Moreover, although the technique disclosed in the Patent Document 4 has a visibility ensured, it requires a thin film metal layer to be stuck onto a device, which is originally unnecessary itself, whereby the step becomes complicated, becoming a factor for a cost increase. Even if the same technique is applied to a metallic member, moreover, it is hard to ensure the visibility.

PRIOR ART DOCUMENT

Patent Document

Patent Document 1: Japanese Patent Application Laid-Open No. 2001-200345
Patent Document 2: Japanese Patent Application Laid-Open No. 2002-316236
Patent Document 3: Japanese Patent Application Laid-Open No. 11-033752 (1999)
Patent Document 4: Japanese Patent Application Laid-Open No. 2003-197402

SUMMARY OF THE INVENTION

The present invention is made in consideration of the problems, and it is an object to provide a method for marking in which a corrosion resistance in a marking target is ensured. Moreover, it is a second object to provide a method for marking on a metallic member in which a visibility is ensured well.

To achieve the above objects, a first aspect of the present invention provides a method for laser marking on a metallic member including: a base treating step of irradiating a base treatment target region including a marking target region on a marking target surface of the metallic member with a laser beam on a first irradiation condition; and a marking step of irradiating the marking target region with the laser beam on a second irradiation condition, thereby forming a marking pattern, wherein a charged energy of the laser beam on the first irradiation condition is set to be smaller than a charged energy of the laser beam on the second irradiation condition, thereby to provide between the marking pattern and a non-irradiation region which is not irradiated with the laser beam, a base region having a residual stress greater than that of the non-irradiation region and smaller than that of the marking pattern.

A second aspect of the present invention provides the method for laser marking according to the first aspect, wherein a surface roughness of the base region is smaller than a surface roughness of each of the non-irradiation region and the marking pattern.

A third aspect of the present invention provides the method for laser marking according to the second aspect, wherein a surface roughness of the marking target surface is equal to or greater than 0.01 μm and is equal to or smaller than 1.0 μm.

A fourth aspect of the present invention provides the method for laser marking according to the first aspect, wherein the metallic member is stainless steel and has a hardness which is equal to or greater than 300 Hv.

A fifth aspect of the present invention provides the method for laser marking according to the fourth aspect, wherein the metallic member is subjected to a heat treatment for increasing a hardness prior to the base treating step.

A sixth aspect of the present invention provides the method for laser marking according to the first aspect, wherein irradiation of the laser beam is carried out by relatively moving a predetermined laser beam emitting source with respect to the marking target surface, and the base region is provided by setting a scanning speed of the laser beam on the first irradiation condition to be higher than a scanning speed of the laser on the second irradiation condition.

According to the first to sixth aspects of the present invention, the base region having the residual stress greater than that of the non-irradiation region and the residual stress smaller than that of the marking pattern is provided between the marking pattern and the non-irradiation region, so as to prevent the occurrence of stress corrosion cracking whose starting point is the base region or the marking pattern.

According to the second and third aspects of the present invention, moreover, the base region having a small surface roughness is provided, so that a concavo-convex difference is made between the marking pattern and its peripheral base region, and a difference is made in the surface roughness both between the base region and its peripheral non-irradiation region and between the marking pattern and its peripheral base region. Consequently, the visibility of the marking pattern can be ensured.

According to the fourth or fifth aspect of the present invention, furthermore, the marking is carried out over the metallic member in which a residual stress difference between the marking pattern and its peripheral base region and a residual stress difference between the base region and its peripheral non-irradiation region are sufficiently smaller than a residual stress difference between the marking pattern and a periphery thereof in the conventional technique, and therefore, it is possible to more reliably suppress the stress corrosion cracking whose start point is the base region or the marking pattern.

According to the sixth aspect of the present invention, moreover, it is possible to switch the base treatment and the marking process only by mechanical operation control without changing an irradiation state itself from an emitting source of a laser beam, whereby it is possible to easily switch both of them.

BRIEF DESCRIPTION OF DRAWINGS

FIG. 1 is a view schematically showing a state of a marking process using a laser beam.

FIG. 2 is a view showing a state from a start to an end of the marking process which is carried out according to the present embodiment thereof.

FIG. 3 is a view showing the state from the start to the end of the marking process which is carried out according to the present embodiment thereof.

FIG. 4 is a view showing the state from the start to the end of the marking process which is carried out according to the present embodiment thereof.

FIG. 5 is a view showing the state from the start to the end of the marking process which is carried out according to the present embodiment thereof.

FIG. 6 is a view showing the state from the start to the end of the marking process which is carried out according to the present embodiment thereof.

FIGS. 7A and 7B are charts schematically showing a relative magnitude relationship of a mean height of a surface position and a surface roughness in various portions of a metallic member M, together with the conventional case.

FIGS. 8A and 8B are charts schematically showing a relative magnitude relationship of a residual stress in various portions of the metallic member M, together with the conventional case.

FIGS. 9A and 9B are charts schematically showing a relative magnitude relationship of a mean height of a surface position and a surface roughness in various portions of a metallic member M according to a variant, together with the conventional case.

EMBODIMENT FOR CARRYING OUT THE INVENTION

<Principle of Marking>

Figure 10:
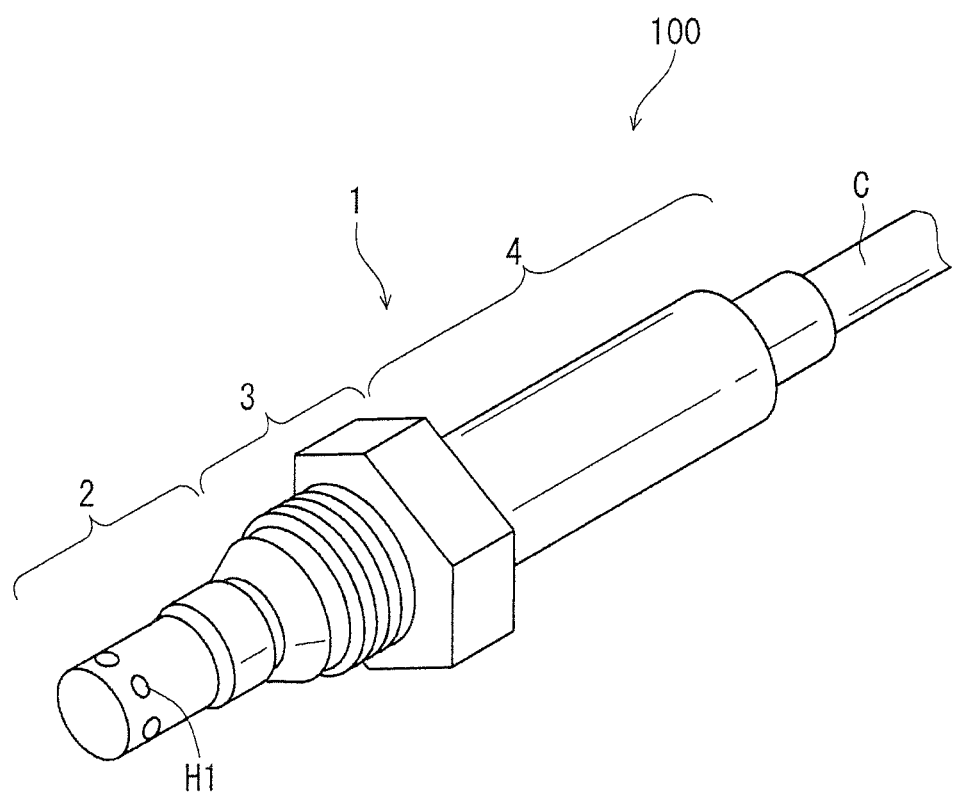
FIG. 10 is a perspective view showing an external appearance of a body portion 1 in a gas sensor 100 as an example of a target of the marking process according to the present embodiment.

FIG. 1 is a view schematically showing a state of a marking process using a laser beam. The marking process according to the present embodiment refers to processing for carrying out, depending on a predetermined marking pattern (for example, a character or the like), a process for irradiating a marking target surface M1 of a metallic member (which will also be referred to as a base material) M with a laser beam LB emitted from an emitting source S and scanning the laser beam LB in a predetermined scanning direction DR, thereby forming a processing line L which is a linear affected region or a concave portion on the marking target surface M1 as shown in FIG. 1. Consequently, a marking pattern is formed on the marking target surface M1.

Stainless steel, a rolled steel plate, an aluminum alloy, a titanium alloy, a magnesium alloy or the like is suitable for the metallic member M. In the present embodiment, it is assumed that a concavo-convex having a surface roughness value of approximately 0.01 μm or more to 1.0 μm or less is formed on the marking target surface M1 of the metallic member M, unless otherwise stated. For example, a processed surface of stainless steel which have been heat-treated at a temperature of 500° C. to 600° C. and have been subjected to pressing such as deep drawing in order to ensure a predetermined hardness or the like satisfies the range of the surface roughness described above. However, this does not exclude an application of a laser marking technique according to the present embodiment to the metallic member M having a surface roughness value out of the range. If the extent of the surface concavo-convex in the marking target surface M1 is within a range that does not disturb the use of the metallic member M, the laser marking technique according to the present embodiment may be applied. Although the surface roughness value is represented by an arithmetic mean roughness (Ra), moreover, it is also possible to take a mode for representing the surface roughness value by using a root mean square roughness (RMS) or other surface roughness indices. In that case, a range of a surface roughness value for satisfying a certain requirement may also be set depending on the index.

As the laser beam LB, a laser beam having a wavelength of approximately 0.2 µm to 10 µM may be used. For example, it is possible to use an Nd:YAG laser, an Nd:YVO$_4$ laser, an ultraviolet laser, a fiber laser and the like. Specifically, it is sufficient that the emitting source S includes a laser oscillator for emitting such a laser, an optical system for regulating a beam shape or the like of the laser beam LB, and the like.

FIGS. 2 to 6 are views showing a state from a start to an end of the marking process which is carried out according to the present embodiment thereof, respectively.

First of all, as shown in FIG. 2, a marking target region RE1 is set to the marking target surface M1 of the metallic member M. The marking target region RE1 is a region in which the marking is to be carried out, specifically, a region in which the irradiation of a laser beam is to be carried out for the marking. In example shown in FIGS. 2 to 6, it is assumed that the marking target region RE1 is set in such a manner that five characters of "A" are printed adjacently to each other.

In the present embodiment, moreover, a base treatment target region RE2 is set corresponding to the setting of the marking target region RE1. The base treatment target region RE2 is set to include the whole marking target region RE1 in the marking target surface M1. Although the base treatment target region RE2 is set to take a rectangular shape in FIG. 6, it may be set to take another shape as long as the whole marking target region RE1 is included. In consideration of a preliminary irradiation treatment which will be described below, however, it is preferable that the base treatment target region RE2 should be set to take such a shape as to easily enable high-speed scanning of a laser beam. In this respect, it is more suitable that the base treatment target region RE2 is set to take the rectangular shape.

Next, the base treatment is carried out over the whole base treatment target region RE2 being set. The base treatment is a process for irradiating the base treatment target region RE2 with the laser beam LB on an irradiation condition (a base treatment irradiation condition) in which an energy (a charged energy) to be given to the metallic member M is smaller as compared with an irradiation condition (which will be hereinafter referred to as the main irradiation condition) for the laser beam LB in the execution of the marking process which will be described below. The base treatment is carried out including the marking target region RE1.

At the time of the base treatment, as shown in FIG. 3, the base treatment target region RE2 is first irradiated with the laser beam LB from the emitting source S while the emitting source S is relatively moved in a direction of an arrow AR1 with respect to the metallic member M on a certain base treatment irradiation condition, so that scanning in the direction of the arrow AR1 through the laser beam LB is carried out to form the processing line L along a scanning trajectory thereof. Then, the moving direction of the emitting source S is inverted in an adjacent position to the processing line L to cause the laser beam LB to carry out the scanning in a direction of an arrow AR2. By sequentially repeating these until the whole base treatment target region RE2 is processed, a base region RE3 is formed in the base treatment target region RE2 as shown in FIG. 4. Although reciprocal scanning is set to be carried out in FIG. 3, it is also possible to take a mode in which the relative movement of the emitting source S with the irradiation of the laser beam is performed in only one direction. This is also the same in the case of the marking process which will be described below.

It is also possible to carry out the relative movement of the emitting source S with respect to the metallic member M by fixing the metallic member M and moving the emitting source S or by fixing the emitting source S and moving the metallic member M (more specifically, a fixing member obtained by mounting and fixing the metallic member M). This is also the same in the case of the marking process which will be described below.

As a way for setting the base treatment irradiation condition, it is suitable to cause a condition for emitting the laser beam LB from the emitting source S (for example, a peak power or the like) to be identical to the main irradiation condition, while to increase a scanning speed (a moving speed of the emitting source S) of the laser beam LB more greatly than that of the main irradiation condition. This is because, in this case, an irradiation time for the laser beam LB per unit region is reduced; thereby a charged energy in the unit region is decreased. Moreover, the change of the scanning speed can be usually executed by only mechanical operation control, and the irradiation state itself of the laser beam LB from the emitting source S does not need to be changed, therefore, it is also advantageous in that its execution is easy. More specifically, it is suitable to carry out the irradiation of the laser beam LB at a scanning speed which is approximately three to six times as high as an upper limit of the scanning speed in the marking process. However, it is necessary to set the scanning speed within a range in which the base treatment itself can suitably be carried out.

In the base treatment, since the charged energy of the laser beam LB is smaller than that in the marking process, it is removal of a convex portion (a projection portion) which had been present before the irradiation that mainly occurs in a place irradiated with the laser beam LB in the base treatment, and formation of a new concave portion is not always predominant. For this reason, the base region RE3 is a homogenized and flattened portion which hardly has a difference in a height from the marking target surface M1 while having a smaller surface roughness than that of the marking target surface M1 on an average basis. In many cases, the marking target surface M1 which is not subjected to the base treatment has metallic luster by recognition with the naked eye, while the base region RE3 has no such luster and is observed in a paler color than the marking target surface M1.

For example, if the surface roughness value of the base treatment target region RE2 before the base treatment is approximately 0.05 µm, the surface roughness value is reduced to be approximately 0.02 µm in the base region RE3 formed by the execution of the base treatment.

In the present embodiment, after such base treatment is performed, the marking process is carried out. Namely, as shown in arrows AR3 and AR4 in FIG. 5, it is performed in a manner that only the marking target region RE1 is irradiated with the laser beam LB on the main irradiation condition while a region other than the marking target region RE1 is not irradiated with the laser beam LB, with the emitting source S relatively moved with respect to the metallic member M. As a matter of course, the affection with the irradiation and the formation of the concave portion occur in only a portion which is irradiated with the laser beam LB and is charged with the energy of the laser beam. In FIG. 5, the arrows AR3 and AR4 are shown in a solid line in a place to be irradiated with the laser beam LB and in a broken line in the other places.

It is preferable that the specific setting content of the main irradiation condition should be determined depending on a type of the laser beam LB, a material of the metallic member M or the like on the premise that a marking pattern MP is formed well. However, it is not preferable that the scanning speed is excessively low, because an irradiation energy per unit time in the marking target region RE1 is made excessive so that a residual stress in the marking pattern MP is increased excessively. On the other hand, it is not preferable that the scanning speed is excessively high, because the formation itself of the marking pattern MP is not sufficiently carried out by reason that an energy having an enough irradiation energy per unit time is not applied. In consideration of this respect, it is suitable that the scanning speed is approximately 90 mm/s to 500 mm/s.

The irradiation of the laser beam LB in such manner is sequentially repeated until the whole marking target region RE1 is processed so that the marking pattern MP is formed as shown in FIG. 6. The marking pattern MP obtained has a more excellent visibility than that of the marking pattern MP which is formed without the execution of the base treatment as in the conventional art. Roughly speaking, in the present embodiment, the visibility is assumed to mean that the marking pattern MP can be clearly distinguished from the periphery and visual information given by the marking pattern MP can easily be recognized in the case in which an observer recognizes the marking target surface M1 of the metallic member M by the naked eye. In short, in the case that a difference in a visual appearance between the target portion and the periphery (for example, a difference in a color, a contrast, a brightness or the like) is obvious, visibility is considered to be high. In many cases, the marking pattern MP is observed to have a deeper color than the peripheral base region RE3 by the recognition with the naked eye. The implementation of the visibility will be described below in detail.

Moreover, the metallic member M having the obtained marking pattern MP formed thereon has a more excellent corrosion resistance than the marking pattern MP formed without the execution of the base treatment as in the conventional art. In the present embodiment, however, the corrosion resistance means that the metallic member M is prevented from causing stress corrosion cracking whose starting point is the base region RE3 or the marking pattern MP. The implementation of the corrosion resistance will be described below in detail.

<Visibility of Marking Pattern>

FIGS. 7A and 7B are charts schematically showing a relative magnitude relationship of a mean height of a surface position and a surface roughness in various portions of the metallic member M for each of the case in which the base treatment is not carried out but the marking process is directly performed over the marking target surface M1 as in the conventional laser marking technique and the case in which the base treatment is carried out and then the marking process is performed as in the present embodiment. In FIGS. 7A and 7B, for convenience, a region in which neither the base treatment nor the marking process is carried out (a non-irradiation region) is represented as the marking target surface M1. A state of the marking target surface M1 shown in FIGS. 7A and 7B not only represents a state of the non-irradiation region but also states of the base region RE3 and the formation region for the marking pattern MP which are before being subjected to the base treatment and the marking process. Moreover, it is assumed that the surface roughness value of the marking target surface M1 is approximately equal to or greater than 0.01 μm and equal to or smaller than 1.0 μm.

First of all, FIG. 7A shows the case of the conventional technique. In this case, the laser beam LB is irradiated on an irradiation condition that the marking pattern MP is formed as a concave portion having a smaller mean height than the peripheral marking target surface M1. In other words, the laser beam LB is irradiated at such a charged energy that the concave portion is formed. As a result, an extent of a surface roughness in the marking pattern MP at this time is hardly different from that in the marking target surface M1. Although, for simplicity of illustration in FIG. 7A, the surface roughness of the marking target surface M1 (the non-irradiation region) is set to be equal to that of the marking pattern MP, a slight difference is actually made between both of them.

In contrast, FIG. 7B shows the case of the present embodiment. In the case of the present embodiment, the base region RE3 formed by the base treatment is a homogenized and flattened region having a mean height which is hardly different from the marking target surface M1 or is slightly smaller than the marking target surface M1 (the non-irradiation region) and having a smaller surface roughness than the marking target surface M1 (the non-irradiation region). This is implemented by the irradiation of the laser beam LB in accordance with the base treatment irradiation condition in which the charged energy of the laser beam LB is smaller than that of the main irradiation condition for forming the marking pattern MP in the base treatment.

On the other hand, the marking pattern MP formed by the irradiation of the laser beam LB on the main irradiation condition is a concave portion having a smaller mean height than the peripheral base region RE3 and a greater surface roughness than the base region RE3. In other words, as shown in FIG. 7B, there are differences in both of the mean height and the surface roughness between the marking pattern MP and its peripheral base region RE3.

In the case of the present embodiment, accordingly, the base region RE3 is provided to have a small surface roughness, so that a concavo-convex difference is given between the marking pattern MP and its peripheral base region RE3, and a difference is given to the surface roughness both between the base region RE3 and its peripheral marking target surface M1 (the non-irradiation region) and between the marking pattern MP and its peripheral base region RE3. It can be said that the visibility of the marking pattern MP is ensured owing to these differences.

In contrast, in the case of the conventional technique, while the concavo-convex difference is given between the marking pattern MP and its peripheral marking target surface M1 (the non-irradiation region), the surface roughness hardly has a difference. For this reason, it is supposed that the visibility of the marking pattern MP cannot be obtained sufficiently.

In the present embodiment, moreover, a depth of the concave portion to be formed as the marking pattern MP may be approximately equal to that in the case of the conventional technique, and such case is illustrated also in FIG. 7B. Differently from the case of the conventional technique, however, the marking pattern MP is formed for the base region RE3 having a small surface roughness, so that also in the case that the concave portion to be formed is shallower (its depth is smaller) than that in the case of the conventional technique, or in the case that the surface roughness of the marking pattern MP is further smaller than that of the marking target surface M1 (the non-irradiation region), it is possible to form the marking pattern MP having a sufficient visibility. This means that, in the case that the marking treatment is performed after the completion of the base treatment, as in the present embodiment, the marking pattern MP having a more excellent visibility than that in the conventional art can be formed even if the irradiation of the laser beam LB with a smaller charged energy is carried out as compared with the case of the conventional technique in which the base treatment is not performed.

<Corrosion Resistance of Marking Pattern>

When the metallic member M is irradiated with the laser beam LB, a very great energy is applied instantaneously so that a residual stress is generated in an irradiated region thereof. In other words, a difference in a stress state is made between a region which is irradiated with the laser beam LB and a region which is not irradiated.

FIGS. 8A and 8B are charts schematically showing a relative magnitude relationship of the residual stresses in the various portions of the metallic member M, for the case in which the base treatment is not carried out but the marking process is directly performed over the marking target surface M1 as in the conventional laser marking technique and for the case in which the base treatment is carried out and then the marking process is performed as in the present embodiment, respectively. Also in the case shown in FIGS. 8A and 8B, moreover, it is assumed that the surface roughness value of the marking target surface M1 is approximately equal to or greater than 0.01 µm and equal to or smaller than 1.0 µm, in the same manner as in the case of FIGS. 7A and 7B.

In the case in which the base treatment is not carried out but the marking pattern MP is formed as in the conventional art, there is schematically obtained a two-stage distribution in which the residual stress is relatively great in the marking pattern MP and the residual stress is relatively small in its peripheral marking target surface M1 (the non-irradiation region) as shown in FIG. 8A. It is supposed that this difference in the residual stress between the marking pattern MP and a periphery thereof (or a residual stress gradient between both of them) is a main factor of an occurrence of stress corrosion cracking whose starting point is the marking pattern MP in the metallic member M which is subjected to laser marking by the conventional technique.

On the other hand, in the case that the base treatment is carried out and then the marking process is performed as in the present embodiment, when the base treatment is carried out, the residual stress is generated in the base region RE3 formed by the base treatment, and furthermore, in the subsequent marking process, the residual stress is generated in the marking pattern MP. FIG. 8B illustrates the case that an almost equal residual stress to that in the case that the base treatment is not carried out is generated in the latter process. However, since the charged energy of the laser beam LB in the base treatment is relatively smaller as compared with the case of the marking process, it is supposed that the residual stress generated in the base region RE3 by the base treatment is smaller than the residual stress generated in the marking pattern MP by the marking process.

In other words, in the case of the present embodiment, it is supposed that the residual stress has a three-stage distribution. Therefore, it is supposed that a residual stress difference between the marking pattern MP and its peripheral base region RE3 and a residual stress difference between the base region RE3 and its peripheral marking target surface M1 (the non-irradiation region) are smaller than a residual stress difference between the marking pattern MP and its periphery in the conventional technique. Alternatively, with the base region RE3 interposed, in the present embodiment, it can be also said that the residual stress gradient between the marking pattern MP and the marking target surface M1 (the non-irradiation region) is smaller than that in the case of the conventional technique.

It is supposed that the fact that the metallic member M has such distribution of the residual stress contributes to prevention of the stress corrosion cracking whose starting point is the base region RE3 or the marking pattern MP, that is, enhancement in the corrosion resistance of the marking pattern MP.

In some cases, a heat treatment for increasing a hardness is carried out over the metallic member M which is before being subjected to the base treatment and the marking process. Such heat treatment also produces an advantage that the residual stress difference as described above is reduced. The reason is that the base treatment is carried out in a state in which an absolute value of the residual stress of the marking target surface M1 (the non-irradiation region) is increased. For example, it is apparent that the execution of the heat treatment to the extent that a Vickers hardness is equal to or greater than 300 Hv is suitable for implementing a state in which the residual stress difference is sufficiently small and obtaining a corrosion resistance more reliably.

As described above, in the present embodiment, prior to the formation of the marking pattern on the marking target surface of the metallic member, the base treatment is carried out over a region including its formation target region, and the marking pattern is formed on the base region thus formed. Consequently, it is implemented to suppress the occurrence of the stress corrosion cracking whose starting point is the marking pattern. Moreover, with the formation of the base region, the formed marking pattern has an excellent visibility.

<Variations>

The technique for the laser marking according to the embodiment described above may also be applied to a metallic member M having a more excellent surface flatness in which a surface concavo-convex of a marking target surface M1 is smaller than that described above, for example, a surface roughness has a value of 0.01 µm or less. FIGS. 9A and 9B are charts obtained by setting such a metallic member M as a target and schematically showing a relative magnitude relationship of a mean height of a surface position and a surface roughness in various portions of the targeted metallic member M, for each of the case in which a base treatment is not carried out but a marking process is directly preformed over the marking target surface M1 and the case in which the base treatment is carried out and then the marking process is performed.

In this case, the relationship between the surface position and the surface roughness in the case in which the base treatment is not carried out is the same as that in the case of FIG. 7A, as shown in FIG. 9A, but the relationship between both of them in the case that the base treatment is carried out is different from that in the case of FIG. 7B. As shown in FIG. 9B, specifically, a surface roughness of a base region RE3 formed by carrying out the base treatment is made greater than before the treatment. However, since a surface roughness of a marking pattern MP formed by the laser marking to be subsequently carried out is greater than a surface roughness of the base region RE3, the marking pattern MP having a visibility ensured sufficiently can be similarly formed in the case in which the surface flatness of the metallic member M is excellent.

On the other hand, the relationship between residual stresses of the respective portions is the same as that in the case shown in FIG. 8B. In other words, also in the case that the marking is carried out over the metallic member M having an excellent surface flatness, a residual stress difference between the marking pattern MP and a periphery is reduced owing to the presence of the base region RE3, and as a result, an excellent corrosion resistance can be realized. More specifically, it is possible to form the marking pattern MP which is excellent in the visibility and the corrosion resistance.

A certain contrast is also generated between an irradiated region formed by irradiation of a laser beam LB on a base treatment irradiation condition and the metallic member M, therefore, it is also possible to suppose a mode for carrying out the laser marking over the metallic member M under such irradiation condition. However, a thin character, mark or the like is mainly subjected to the laser marking, whereas a color of the irradiated region formed under the base treatment irradiation condition is pale in many cases, and therefore even if the thin character or mark is formed on the base treatment irradiation condition, it is poorer than that in the embodiment described above in respect of the visibility. Moreover, increase in an intensity of a laser beam to enhance the visibility ultimately approximates to the conventional technique so that a possibility of the stress corrosion cracking is increased. On the other hand, when the intensity of the laser beam is decreased, the visibility itself is reduced. In other words, it can be said that it is limited in some cases that the marking is carried out through only the irradiation of the laser beam on the base treatment irradiation condition so that a suitable marking pattern is formed.

EXAMPLE (Target of Marking)

Figure 11:
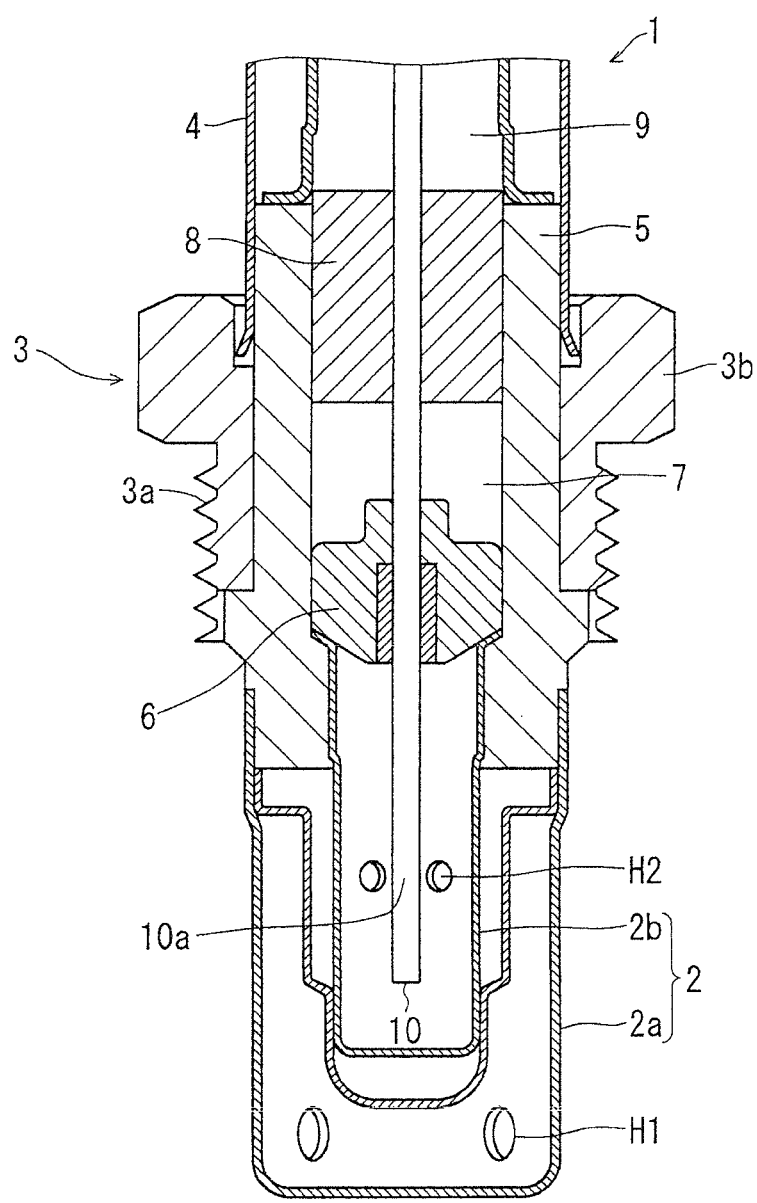
FIG. 11 is a sectional view showing an internal structure of a main part of the sensor body portion 1.

FIG. 10 is a perspective view showing an external appearance of a body portion (hereinafter referred to as a sensor body portion) 1 in a gas sensor 100 as an example of a target of a marking process according to the present embodiment. FIG. 11 is a sectional view showing an internal structure of a main part in the sensor body portion 1. In the present embodiment, the gas sensor 100 serves to detect a predetermined gas component (for example, NOx or the like) by a sensor element 10 (FIG. 11) provided on its inner part.

The sensor element 10 is a member which contains, as a main constituent material, an element body constituted by oxygen ion conductive solid electrolyte ceramics such as zirconia and takes a shape of a long column or a thin plate. The sensor element 10 has a structure including a gas inlet, an internal space and the like at a tip portion 10a side, and furthermore, various electrodes and wiring patterns on a surface of the element body and an inner part thereof. In the sensor element 10, a test gas introduced into the internal space is reduced or decomposed in the internal space so that an oxygen ion is generated. In the gas sensor 100, a concentration of the gas component in the test gas is obtained based on the fact that an amount of the oxygen ion flowing through the inner part of the element is proportional to the concentration of the gas component.

An outside of the sensor body portion 1 of the gas sensor 100 is mainly constituted by a first cover 2, a fixing bolt 3 and a second cover 4.

The first cover 2 is a substantially cylindrical exterior member for protecting a portion to directly come in contact with the test gas in use, specifically, the tip portion 10a provided with the gas inlet, the internal space and the like in the sensor element 10. In more detail, the first cover 2 has a two-layer structure including an outer cover 2a and an inner cover 2b. The outer cover 2a and the inner cover 2b take a closed-end cylindrical shape at one side respectively, and furthermore, are provided with a plurality of through holes H1 and H2 through which a gas can pass in side surface portions. Positions in which the through holes H1 and H2 shown in FIGS. 10 and 11 are disposed and numbers disposed are illustrative only and not restricted thereto.

The fixing bolt 3 is a ring-shaped member to be used in fixation of the sensor body portion 1 into a measuring position. The fixing bolt 3 includes a threaded bolt portion 3a and a holding portion 3b on which the bolt portion 3a is held when screwed. The bolt portion 3a is screwed into a nut provided in an attaching position of the sensor body portion 1. For example, the bolt portion 3a is screwed into a nut portion provided on an exhaust pipe of a car so that the sensor body portion 1 is fixed to the exhaust pipe in such a mode that the first cover 2 side is exposed into the exhaust pipe.

The second cover 4 is a cylindrical member for protecting the other parts of the sensor body portion 1. A cable C for electrically connecting the sensor body portion 1 to a driving control portion which is not shown is extended from an end of the second cover 4.

The second cover 4 is constituted by austenitic stainless steel which has been heat-treated at a temperature of 500° C. to 600° C. (for example, SUS304L or the like). It is previously confirmed that a Vickers hardness of the stainless steel is equal to or greater than 300 Hv if a heat treatment temperature is 500° C. to 600° C., but the Vickers hardness of the stainless steel is smaller than 300 Hv if the heat treatment temperature is lower than 300° C. Moreover, the first cover 2 and the second cover 4, both of which take cylindrical shapes are fabricated by carrying out deep drawing over a plate formed by the stainless steel in a thickness of approximately 0.2 mm to 0.6 mm (for example, 0.55 mm) and performing barrel polishing over a surface thereof.

For the sensor body portion 1, product-identifying information, for example, a name of a manufacturer, a name of a country, a product model, a lot number, an individual identification number and the like are marked (printed) on an outside surface of the second cover 4.

In the inner part of the sensor body portion 1, as shown in FIG. 11, the sensor element 10 is fitted in respective axial center positions of a plurality of insulators and a plurality of sealing members (talc) which are alternately disposed adjacently, except for the tip portion 10a provided with the gas inlet and the like. Although FIG. 11 shows two insulators 6 and 8 and two sealing members 7 and 9, the insulator is further provided adjacently to the sealing member 9 actually. Moreover, the two insulators 6 and 8 and the sealing member 7 provided therebetween are fitted in an inner cylindrical portion of a housing 5 having a substantially cylindrical shape. One of end sides of the housing 5 is fitted in the first cover 2 and the other end side is fitted in the second cover 4 which covers the sealing member 9 and the insulator provided thereon, and the fixing bolt 3 is secured to an outer periphery of the housing 5.

With the structure described above, in the sensor body portion 1, an atmosphere around the tip portion 10a of the sensor element 10 (an atmosphere in the first cover 2) and an atmosphere of an outside are completely blocked in an attachment state into a predetermined position, and consequently, it is possible to measure a concentration of a target gas component in a test gas with high precision.

Experiment Example 1

Figure 12:
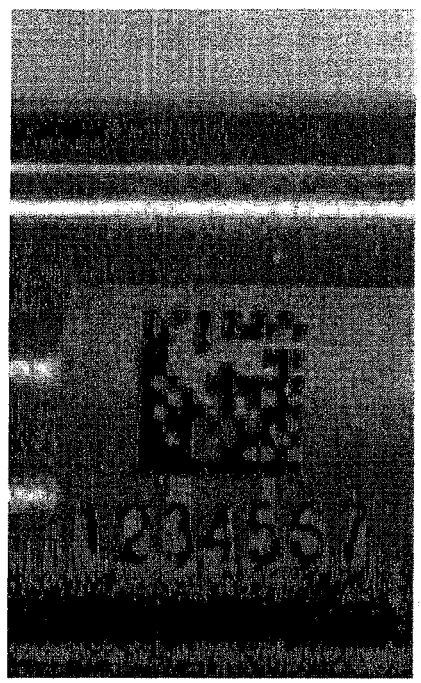
FIG. 12 is an optical microscope image in the vicinity of a marking pattern MP in the case that a base region RE3 is formed and the marking pattern MP is then marked.
Figure 13:
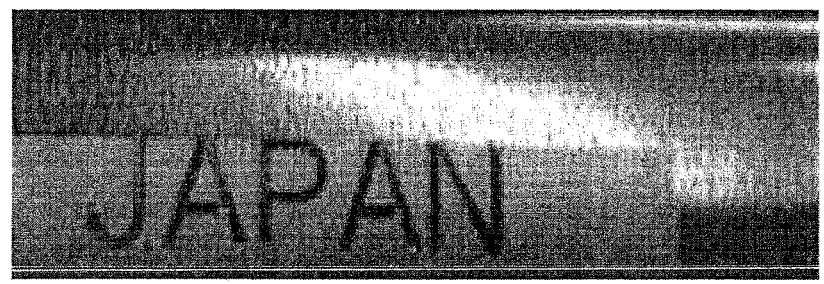
FIG. 13 is an optical microscope image in the vicinity of the marking pattern MP in the case that the base region RE3 is formed and the marking pattern MP is then marked.

FIGS. 12 and 13 show optical microscope images in the vicinity of the marking pattern MP in the case that the outside surface of the second cover 4 in the sensor body portion 1 is set to be the marking target surface M1, the base region RE3 is formed, and then, the marking pattern MP is marked. On the other hand, FIG. 14A shows an optical microscope image and FIG. 14B is a view for explaining its imaging content in the case that the outside surface of the second cover 4 in the sensor body portion 1 is set to be the marking target surface M1 and the marking pattern MP is marked without execution of a base treatment.

In any case, an Nd; YVO$_4$ laser having an emission wavelength of 1.06 μm was used as the laser beam LB. A power (a peak power) of the laser beam LB was set to be 9.6 W and a frequency was set to be 100 kHz. A scanning speed was set to be 3000 mm/s in the base treatment and 160 mm/s in the marking process. Moreover, a line width of the marking pattern MP was set to be 0.1 mm.

It is apparent from FIGS. 12 and 13 that the marking pattern MP has an excellent visibility in the case in which the base region RE3 is formed. On the other hand, in FIG. 14A, although two characters of "9" and "E" should have been marked as shown in FIG. 14B, contrast of the marking pattern MP and the peripheral marking target surface M1 is hardly made, and there is brought a state in which the visibility is extremely low.

Figure 14A:
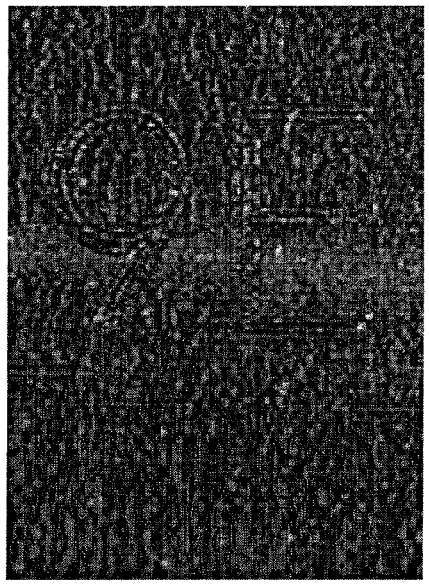
FIG. 14A is an optical microscope image in the case that the marking pattern MP is marked without execution of a base treatment and FIG. 14B is a view for explaining an imaging content thereof.
Figure 14B:
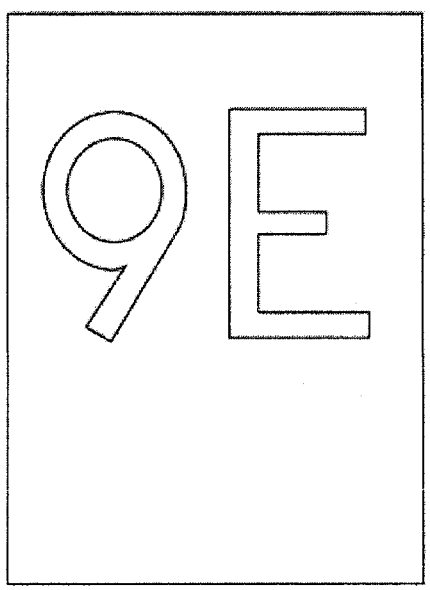

That is, in contrast of FIGS. 12 and 13 and FIG. 14A, it is indicated to be effective for ensuring the visibility of a marking pattern that the base region is formed by the base treatment, and then, the marking pattern is marked in the base region.

Experiment Example 2

Fifteen types of second covers 4 in total which had been subjected to the marking process (specimen Nos. 1 to 15) were fabricated, with a type of the metallic member M to be a base material, presence or absence of the base treatment, and the irradiation condition of a laser beam in the marking process variously changed, and a stress corrosion cracking test was conducted for each of them. In addition, there was also confirmed the visibility of the marking pattern MP for the specimens after the test. A test lot number was set to be five except for the specimen of No. 15. The test lot number was set to be two only for the No. 15.

Specifically, SUS304L having a thickness of 0.5 mm and having been subjected to a heat treatment was prepared as the base material and was subjected to deep drawing, and barrel polishing was then carried out, so that the second cover 4 was obtained. A heat treatment temperature in that case was set into two levels of 550° C. and 400° C.

In the base treatment and the marking process, an Nd; YVO$_4$ laser having an emission wavelength of 1.06 μm was used as the laser beam LB. A power (a peak power) of the laser beam LB was set to be 9.6 W and a frequency was set to be 100 kHz.

A scanning speed of the laser beam LB (specifically, a scanning speed of the emitting source S) was set to be 3000 mm/s in the base treatment. On the other hand, the scanning speed in the marking process was set into five levels of 45 mm/s, 90 mm/s, 160 mm/s, 500 mm/s and 1000 mm/s.

The stress corrosion cracking test was conducted in accordance with the JIS G 0576 A. Specifically, a 42% magnesium chloride solution having a boiling point of 143° C.±1° C. was prepared as a test solution and the respective specimens were immersed in the test solution with a temperature maintained to be the boiling point; every time a certain time passes, the specimen was taken out of the test solution and was observed by using a magnifying glass to confirm the presence or absence of the occurrence of a crack. Moreover, the visibility of the marking pattern MP was confirmed by the naked eye. It is supposed that the crack occurs due to the stress corrosion cracking. An immersing time in the test solution was set into four levels of 30 minutes, 60 minutes, 90 minutes and 120 minutes.

Table 1 shows a condition for fabricating the respective specimens, a result of the stress corrosion cracking test, and a result of the confirmation of the visibility. In the Table 1 and thereafter, the specimens of Nos. 1 to 5 in which the base material is a heat-treated product at 550° C. and the base treatment was not carried out will be generically referred to as a group A, the specimens of Nos. 6 to 10 in which a base material is a heat-treated product at 550° C. and the base treatment was carried out will be generically referred to as a group B, and the specimens of Nos. 11 to 15 in which a base material is a heat treated product at 400° C. and the base treatment was carried out will be generically referred to as a group C.

TABLE 1

| | Specimen No. | Base material | Laser beam irradiation condition | | | | Rate of occurrence of crack for each magnesium chloride immersion time | | | | Visibility ○: Excellent Δ: Poor |
| --- | --- | --- | --- | --- | --- | --- | --- | --- | --- | --- | --- |
| | | | Base treatment | | Marking process | | | | | | |
| | | | Power (W) | Speed (mm/s) | Power (W) | Speed (mm/s) | 30 minutes | 60 minutes | 90 minutes | 120 minutes | |
| Group A | 1 | 550° C. heat treated product | No irradiation | | 9.6 | 45 | 5/5 | | | | ○ |
| | 2 | | | | | 90 | 5/5 | | | | ○ |
| | 3 | | | | | 160 | 5/5 | | | | ○ |
| | 4 | | | | | 500 | 1/5 | 5/5 | | | ○ |
| | 5 | | | | | 1000 | 0/5 | 0/5 | 0/5 | 0/5 | Δ |
| Group B | 6 | 550° C. heat treated product | 9.6 | 3000 | 9.6 | 45 | 1/5 | 5/5 | | | ○ |
| | 7 | | | | | 90 | 0/5 | 0/5 | 0/5 | 1/5 | ○ |
| | 8 | | | | | 160 | 0/5 | 0/5 | 0/5 | 0/5 | ○ |
| | 9 | | | | | 500 | 0/5 | 0/5 | 0/5 | 0/5 | ○ |
| | 10 | | | | | 1000 | 0/5 | 0/5 | 0/5 | 0/5 | Δ |
| Group C | 11 | 400° C. heat treated product | 9.6 | 3000 | 9.6 | 45 | 5/5 | | | | ○ |
| | 12 | | | | | 90 | 5/5 | | | | ○ |
| | 13 | | | | | 160 | 5/5 | | | | ○ |
| | 14 | | | | | 500 | 5/5 | | | | ○ |
| | 15 | | | | | 1000 | 0/2 | 0/2 | 2/2 | | Δ |

As shown in the Table 1, referring to the specimens in the group A, the visibility was excellent but the crack occurred in all of lots at the immersion time of 30 minutes to 60 minutes in the specimens of Nos. 1 to 4 having the scanning speed of 500 mm/s or less. On the other hand, in the specimen of No. 5 having the scanning speed of 1000 mm/s, the crack was not confirmed after the immersion for 120 minutes but the visibility was not sufficient.

On the other hand, referring to the specimens in the group B, the visibility was excellent but the crack occurred in all of the lots at the immersion time of 60 minutes in the specimen of No. 6 having the scanning speed of 45 mm/s. In the specimens of Nos. 7 to 9 having the scanning speed of 90 mm/s to 500 mm/s, the visibility was excellent and the occurrence of the crack was not confirmed except for a very small number of exceptions (one lot in the specimen of No. 7 at the immersion time of 120 minutes). In other words, it can be said that these specimens are excellent in the visibility and a marking pattern having an excellent corrosion resistance is formed. In the specimen of No. 10 having the scanning speed of 1000 mm/s, the crack was not confirmed after the immersion for 120 minutes but the visibility was not sufficient.

Referring to the specimens in the group C, furthermore, the visibility was excellent but the crack occurred in all of the lots at the immersion time of 30 minutes in the specimens of Nos. 11 to 14 having the scanning speed of 500 mm/s or less. On the other hand, in the specimen of No. 15 having the scanning speed of 1000 mm/s, the crack was confirmed after the immersion for 90 minutes and the visibility was not sufficient.

Comparing the results of the group A with the group B, it is apparent that the execution of the base treatment is effective for forming a marking pattern having a corrosion resistance and having the visibility ensured. The reason why the crack occurs in the specimen of No. 6 in the group B irrespective of the execution of the base treatment is supposed to be that the scanning speed was low, resulting in unnecessary increase in the charged energy of the laser beam LB. On the other hand, the reason why the visibility was not sufficient in the specimen of No. 5 in the group A and the specimen of No. 10 in the group B is supposed to be that the scanning speed was excessively high and the charged energy of the laser beam LB was excessively small. In the group B, moreover, the scanning speed of the base treatment is set to be 3000 mm/s which is three times as great as 1000 mm/s to be the scanning speed in the specimen of No. 10, which means that the irradiation of the laser beam is carried out in a smaller charged energy in the base treatment as compared with that in the marking process.

Comparing the results of the group B and the group C, moreover, it can be supposed that the heat treatment at 400° C. which was conducted for the base material of the specimens in the group C cannot give a sufficient hardness to the base material and the residual stress in the marking target surface M1 (the non-irradiation region) after the heat treatment is smaller than that in the case of the group B. Therefore, it can be said that the group B and the group C are common to each other in that the marking process is carried out after the base treatment, but in the case of the group C, since a sufficient residual stress is not generated in the base material subjected to the heat treatment, even if the marking process is carried out on a marking condition in which a marking pattern having an excellent corrosion resistance is formed in the group B, a residual stress difference is increased so that the corrosion resistance could not be obtained. The reason why the occurrence of the crack was not confirmed in the case of the immersion time of 30 minutes in the specimen of No. 15 is guessed that the residual stress difference from the base region RE3 is smaller than that in each of the specimens of No. 11 to No. 14 due to the high scanning speed of 1000 mm/s and the small charged energy.

The invention claimed is:

1. A method for laser marking on a metallic member comprising:
   a base treating step of irradiating a base treatment target region including a marking target region on a marking target surface of said metallic member with a laser beam on a first irradiation condition; and
   a marking step of irradiating said marking target region with said laser beam on a second irradiation condition, thereby forming a marking pattern,
   wherein a charged energy of said laser beam on said first irradiation condition is set to be smaller than a charged energy of said laser beam on said second irradiation condition, thereby to provide between said marking pattern and a non-irradiation region which is not irradiated with said laser beam, a base region having a residual stress greater than that of said non-irradiation region and a residual stress smaller than that of said marking pattern.

2. The method for laser marking on a metallic member according to claim 1, wherein a surface roughness of said base region is smaller than a surface roughness of each of said non-irradiation region and said marking pattern.

3. The method for laser marking on a metallic member according to claim 2, wherein a surface roughness of said marking target surface is equal to or greater than 0.01 µm and is equal to or smaller than 1.0 µm.

4. The method for laser marking on a metallic member according to claim 1, wherein said metallic member is stainless steel and has a hardness which is equal to or greater than 300 Hv.

5. The method for laser marking on a metallic member according to claim 4, wherein said metallic member is subjected to a heat treatment for increasing a hardness prior to said base treating step.

6. The method for laser marking on a metallic member according to claim 1, wherein irradiation of said laser beam is carried out by relatively moving a predetermined laser beam emitting source with respect to said marking target surface, and
   said base region is provided by setting a scanning speed of said laser beam on said first irradiation condition to be higher than a scanning speed of said laser on said second irradiation condition.

* * * * *